(12) United States Patent
Okada et al.

(10) Patent No.: US 7,825,330 B2
(45) Date of Patent: Nov. 2, 2010

(54) SOLAR CELL

(75) Inventors: Kenichi Okada, Tokyo (JP); Hiroshi Matsui, Tokyo (JP); Nobuo Tanabe, Tokyo (JP)

(73) Assignee: Fujikura Ltd., Tokyo (JP)

( * ) Notice: Subject to any disclaimer, the term of this patent is extended or adjusted under 35 U.S.C. 154(b) by 1019 days.

(21) Appl. No.: 11/022,672

(22) Filed: Dec. 28, 2004

(65) Prior Publication Data

US 2005/0126629 A1   Jun. 16, 2005

(51) Int. Cl.
    *H01L 31/00* (2006.01)
(52) U.S. Cl. ...................................... 136/263
(58) Field of Classification Search ......... 136/243–293; 429/111
    See application file for complete search history.

(56) References Cited

U.S. PATENT DOCUMENTS

| | | | | |
|---|---|---|---|---|
| 5,350,644 | A * | 9/1994 | Graetzel et al. | 429/111 |
| 5,549,763 | A * | 8/1996 | Sano et al. | 136/255 |
| 5,669,987 | A * | 9/1997 | Takehara et al. | 136/244 |
| 6,462,266 | B1 * | 10/2002 | Kurth | 136/251 |
| 6,538,194 | B1 * | 3/2003 | Koyanagi et al. | 136/256 |
| 2001/0027806 | A1 | 10/2001 | Yamanaka et al. | |
| 2002/0015881 | A1 * | 2/2002 | Nakamura et al. | 429/111 |

FOREIGN PATENT DOCUMENTS

| | | | | |
|---|---|---|---|---|
| EP | 1489628 A1 * | 12/2004 | | 136/263 |
| EP | 1548868 A1 | 6/2005 | | |
| JP | H04-171681 A | 6/1992 | | |
| JP | H06-215807 A | 8/1994 | | |
| JP | 7-130408 | 5/1995 | | |
| JP | H07-130407 A | 5/1995 | | |
| JP | H07-130408 A | 5/1995 | | |
| JP | H07-245125 A | 9/1995 | | |
| JP | 9-306553 | 11/1997 | | |
| JP | H09-306553 A | 11/1997 | | |
| JP | H10-208782 A | 8/1998 | | |
| JP | 2000-77691 A | 3/2000 | | |

(Continued)

OTHER PUBLICATIONS

Knovel Critical Tables, Dielectric Constants of Common Materials, 2003, Knovel, No. 499.*
Maheshwar, Sharon et al. "Solar Rechargeable Battery—Principle and Materials" Electrochima Acta, vol. 36, No. 7, Jan. 1, 1991, pp. 1107-1126, Pergamon Press: Oxford, Great Britain. p. 1115, figure 11.

*Primary Examiner*—Alexa D Neckel
*Assistant Examiner*—Miriam Berdichevsky
(74) *Attorney, Agent, or Firm*—Sughrue Mion, PLLC

(57) ABSTRACT

A solar cell and photovoltaic power generation apparatus including a transparent electrically conductive film, a semiconductor provided on the transparent electrically conductive film, a conductive film opposing the semiconductor, and an electrolyte solution filled between the semiconductor and the conductive film. Metal ions, such as silver ions, may be dissolved in the electrolyte solution. When light is incident on the cell, the metal ions cause an oxidation-reduction reaction in the electrolyte solution and the cell is charged. When the open-circuit voltage decreases because the amount of incident light drops or light is blocked, the cell discharges to function as a secondary cell.

11 Claims, 3 Drawing Sheets

FOREIGN PATENT DOCUMENTS

| | | |
|---|---|---|
| JP | 2000-243465 A | 9/2000 |
| JP | 2001-15182 A | 1/2001 |
| JP | 2001-283941 A | 10/2001 |
| JP | 2001-283944 A | 10/2001 |
| JP | 2001-283945 A | 10/2001 |
| WO | WO9963614 * 12/1999 | ................. 136/243 |
| WO | WO 00/48212 A1 | 8/2000 |
| WO | WO 03081609 A1 * 10/2003 | ................. 136/263 |

* cited by examiner

SOLAR CELL

This application is based upon and claims the benefit of priority from International Application PCT/JP2003/008653 which is based on Japanese Patent Application No. 2002-199958, filed in Japan on Jul. 9, 2002, the disclosure of which is incorporated herein by reference.

TECHNICAL FIELD

The present invention relates to a solar cell that increases stability of the output voltage (open-circuit voltage) when the amount of incident light fluctuates.

BACKGROUND ART

Ideally, when light is converted to electricity in a solar cell, such as a dye sensitization solar cell, the solar cell generates electricity having a current that is proportional to the amount of incident light and a constant voltage that is dependent on the internal electric potential difference.

In practice, however, the voltage varies in proportion to the amount of incident light due to recoupling of electric charges and the like. For example, as the amount of incident light decreases, the voltage decreases as well as the current.

In order to employ a solar cell in a commercial power supply, a stable supply of electrical power is crucial. In order to supply electrical power in a stable manner, the current-voltage output from the solar cell which varies in proportion to the amount of incident light should be converted to a stable current-voltage characteristic. For example, as shown in FIG. 6, a stabilized power supply circuit 1, such as a switching power supply, is provided. The output from the solar cell main body 2 can be stabilized by providing the output from the solar cell main body 2 to the stabilized power supply circuit 1; thus, a stable electrical power can be supplied to an external apparatus.

To drive the stabilized power supply circuit 1, a certain electrical power must be supplied thereto. For this reason, the current-voltage output from the solar cell main body 2 should fall within a certain range. If sunlight is temporarily blocked, for example by clouds, the output power from the solar cell main body 2 will decrease temporarily, and the stabilized power supply circuit 1 will stop functioning since the electrical power required to drive the stabilized power supply circuit 1 is no longer supplied. As a result, a stable supply of electrical power will be no longer available.

One method to overcome this shortcoming is to install in the solar cell a secondary cell or a large-capacity capacitor which has a voltage characteristic comparable to the generation voltage of the solar cell. In this method, when a large amount of light incident on the solar cell and an electrical power with a voltage higher than a predetermined voltage is generated, the secondary cell or the capacitor is charged whereas the secondary cell or the capacitor discharges when the amount of incident light is low and an electrical power with a voltage lower than the predetermined voltage is generated. Using this method, it is possible to reduce the incidence of stopping of the stabilized power supply circuit 1.

However, addition of such a device external to a solar cell may cause an increase in power loss caused by resistance and the like, and a solar cell can only supply a power as low as a value lower than the actual power generation capacity of the solar cell. Furthermore, addition of an external device may increase the price of the solar cell since the structure of a solar cell and a power generation apparatus using a solar cell may become complex. This method is not a viable option when a low-cost photovoltaic power generation apparatus is desired.

Solar cells are used in a photovoltaic power generation apparatus in which multiple solar cell panels having a predetermined size are arranged. Although solar cell panels connected in parallel pose no problem, in a solar cell in which panels are connected in series for the purpose of reducing power loss caused by resistance or increasing an open-circuit voltage (output voltage), the output power of the apparatus as a whole will significantly decrease because not much current flows in those panels when light incident on some of the panels is blocked by clouds or obstacles.

In order to overcome this shortcoming, some countermeasures, such as independently controlling each of cells or like, are required. However, such a technique may make the whole system complex, and may decrease generation efficiency and increase price.

DISCLOSURE OF THE INVENTION

The present invention provides a power generation apparatus including a solar cell that also functions as a capacitor or a secondary cell and is capable of providing a stable electrical power using the solar cell.

A first aspect of the present invention is a solar cell including an electrolyte solution, and a metal ion dissolved in the electrolyte solution, wherein the solar cell is also capable of functioning as a secondary cell by an oxidation-reduction reaction of the metal ion.

According to the solar cell of the above-described aspect, since the metal ion is dissolved in the electrolyte solution, the metal ion causes the oxidation-reduction reaction in the electrolyte solution. As a result, the solar cell also functions as a secondary cell. The secondary cell is charged when the amount of incident light is sufficient and the output voltage is high whereas the secondary cell discharges when the amount of incident light is not sufficient and the output voltage is low.

A second aspect of the present invention is a solar cell including a transparent electrically conductive film; a current collecting wiring made of a metal film that is provided on the transparent electrically conductive film; a semiconductor provided on the current collecting wiring; a conductive film provided on the semiconductor; and an electrolyte solution filled between the semiconductor and the conductive film.

According to the solar cell of the above-described aspect, the current collecting wiring functions to collect electric charges generated in the semiconductor and to pump the electric charges into the transparent electrically conductive film. Furthermore, since the current collecting wiring is ionized to metal ions which dissolve into the electrolyte, these metal ions cause the oxidation-reduction reaction in the electrolyte when sunlight is incident on the solar cell. As a result, the solar cell also functions as a secondary cell. The secondary cell is charged when the amount of incident light is sufficient and the output voltage is high whereas the secondary cell discharges when the amount of incident light is not sufficient and the output voltage is low.

BEST MODE FOR CARRYING OUT THE INVENTION

A detailed description of the invention follows.

Figure 1:
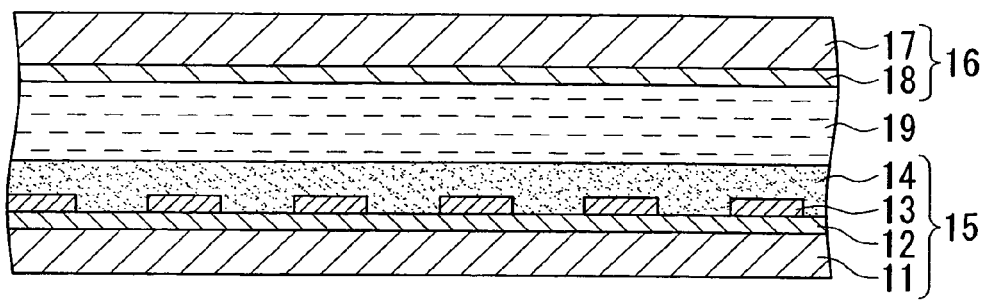
FIG. 1 is a schematic cross-sectional view of a solar cell according to a first embodiment of the present invention.

FIG. 1 is a schematic cross-sectional view of a liquid junction solar cell, as an example of the solar cell according to a first embodiment of the present invention.

In FIG. 1, a transparent conductive layer 12 is provided on one side of a transparent substrate 11. For the transparent substrate 11, glass, or plastic, or the like, may be used. For the transparent electrically conductive film 12, conductive metal oxide, such as tin-doped indium oxide (ITO), fluorine-doped tin oxide (FTO), or the like, may be used.

The transparent substrate 11 is not necessarily required, provided that a transparent conductive layer 12 that is sufficiently strong and provides a sufficient sealing performance is used.

On the transparent conductive layer 12, current collecting wirings 13 made of metal films, such as gold, platinum, silver, copper, aluminum, nickel, cadmium, or the like, are provided.

The current collecting wirings 13 are disposed spaced apart from each other so that light can pass through between the current collecting wirings 13. As a method for forming the metal film, any conventional method, such as plating, physical vapor deposition (PVD; sputtering, ion plating, or the like), chemical vapor deposition (CVD; thermal deposition, plasma deposition, radiation deposition, or the like), spin coating, squeegee method, doctor blade method, screen printing, or the like, may be used. The resultant film may be patterned according to requirement to form the grid- or mesh-like current collecting wirings 13. On the current collecting wirings 13, a semiconductor layer 14 is provided as a protective layer of the wirings 13. Electric charges generated in the semiconductor layer 14 are collected by the current collecting wirings 13, and are pumped to the transparent electrically conductive film 12.

For the semiconductor layer 14, any semiconducting material may be used, and a metal oxide or the like is preferably used. Examples of a metal oxide include titanium oxide, tin oxide, tungsten oxide, zinc oxide, zirconium dioxide, neodymium oxide, hafnium oxide, strontium oxide, indium oxide, cerium oxide, yttrium oxide, lanthanum oxide, vanadium oxide, niobium oxide, tantalum oxide, and the like.

The semiconductor layer 14 is preferably a porous film.

The porous film may be formed using a conventional method, such as a sol-gel method, migration electro-deposition of fine particles, a method using a foaming agent, coating with a mixture of polymer beads or the like followed by removal of the extra component, sintering method, or the like. Among them, a method in which semiconductor particles are sintered to form a porous sintered body is particularly preferable. Furthermore, porous semiconductor material may be subjected to a treatment to increase the surface area thereof. In addition, the sintered body may be loaded with dye on its surface. For the dye, any compounds that have an absorption band in the visible light range or near infrared range and exhibit an excitation behavior suitable for the semiconductor may be used. Examples of the dye include organic dyes, such as azo dyes, methine dye, fullerene derivatives, quinones, cumarin, eosine, rhodamine, merocyanine, or the like; metal complex dyes such as porphyrin, phthalocyanine, or the like; or ruthenium complex dyes; natural dyes such as those derived from plants, or the like. Preferable dyes are metal complex dyes, such as phthalocyanine, porphyrin or the like, or ruthenium complex dyes. A solar cell on which a dye is loaded is referred to as a dye-sensitized solar cell.

As one example of a method for sensitizing with a dye is to dip a staked body of the transparent substrate 11, the transparent conductive layer 12, and the semiconductor layer 13 into a solution containing a dye, and then to dry or heat-dry the stacked body at room temperature to sensitize the semiconductor layer 13 with the dye. The present invention is not limited to this technique, and other methods including soaking methods, such as dipping methods, roller method, air knife method, or the like; coating methods, such as wire bar method, slide hopper method, extrusion method, curtain method, spin method, spray method, or the like, may be used.

The transparent substrate 11, the transparent electrically conductive film 12, and the current collecting wirings 13, and the semiconductor layer 14 are stacked together to form a working electrode 15.

A counter electrode 16 includes a substrate 17 and a conductive layer 18, and is a conductive substrate in which the conductive layer 18 is provided on the substrate 17. The substrate 17 is made of an insulating material, such as glass, ceramic, or the like. For the conductive film used for the conductive layer 18, metals (platinum, gold, silver, copper, aluminum, magnesium, indium, or the like), carbon, conductive metal oxide (ITO, FTO), or the like, may be used. Particularly, platinum, ITO, and FTO are preferable.

The counter electrode 16 may have a single-layer structure of a conductive layer made of a conductive material.

The working electrode 15 and the counter electrode 16 described above are arranged so that they oppose each other, and the electrolyte solution 19 is filled between the two electrodes to form a single cell.

If the cell has flexibility, it is possible to use the cell while bending it or to use the cell in an environment in which it is repeatedly bent.

The electrolyte solution 19 may be either a nonaqueous electrolyte solution prepared by dissolving an electrolyte into a nonaqueous solvent, or a fused salt obtained by fusing an electrolyte. In the instant example of the present invention, a nonaqueous electrolyte solution is used. For the electrolyte (supporting electrolyte), lithium ions, cobalt ions, tetraalkyl ions, imidazolium ions may be used, for example. The nonaqueous solvent is required to have properties to dissolve the electrolyte and to dissociate it into ions, and nonaqueous solvents having a relative dielectric constant ∈r of greater than 20 is preferable. Examples of the nonaqueous solvent include, but are not limited to, ethanol, acetonitrile, methoxy acetonitrile, propionitrile, ethyl carbonate, propyl carbonate, ethylene carbonate, propylene carbonate, γ-butyrolactone, ethylmethyl imidazolium, and any solvent that is conventionally used as a solvent for preparing an electrolyte solution for a solar cell. These nonaqueous solvents are selected according to desired properties, or they may be used in combination.

The electrolyte solution 19 contains a redox couple. Examples of the redox couple include, but not limited to, iodine/iodine ion, bromine/bromine ion, and cobalt/cobalt ion pairs.

In such a solar cell, when light is incident on the semiconductor layer 14 of the working electrode 15, an opto-electric conversion reaction occurs in the semiconductor layer 14 and electrons flow from the working electrode 15 toward the counter electrode 16. The electrons migrated to the counter electrode 16 reduce cations in the electrolyte solution 19. The reduced ions are oxidized again when light is incident on the semiconductor layer 14. This process is repeated, and electric current flows to generate electricity.

Furthermore, in the dye-sensitized solar cell, when light is incident on the semiconductor layer 14 of the working electrode 15, the dye absorbs the light to emit electrons. The emitted electrons migrate to the semiconductor layer 14 and travel to the working electrode 15. After the electrons migrate to the counter electrode 16, they reduce cations in the electrolyte solution 19. The reduced ions are again oxidized on the dye. This process is repeated, and electric current flows to generate electricity.

Furthermore, metal ions, such as silver ions, copper ions, cadmium ions, aluminum ions, nickel ions, or the like, are dissolved in the electrolyte solution 19. These metal ions are selected according to desired properties, and they may be used in combination. The metal ions are dissolved into the electrolyte solution 19 until they are saturated. It may be possible to dissolve particles of an elemental metal in the electrolyte solution 19. However, in the case in which the current collecting wirings 13 made of metal films are provided as in the case of this example, metal ions spontaneously elute from the current collecting wirings 13 to the electrolyte solution 19 may be used as the metal ions. Since the metal in the current collecting wirings 13 elutes to the electrolyte solution 19 until it is saturated, the current collecting wirings 13 should be provided, considering the amount of metal eluted to the electrolyte solution 19, and the sufficient thickness of the current collecting wirings 13 so that the wirings 13 function as a collector.

As mentioned above, by adding metal ions to the electrolyte solution 19, an oxidation-reduction reaction of the metal ions will occur, in addition to the above-described oxidation-reduction reaction of the redox couple. The oxidation-reduction reaction of the metal ions proceeds in the same electrolyte solution as the solar cell, which functions as another cell in the solar cell. In other words, the solar cell itself functions as a secondary cell. The oxidation-reduction reaction of the metal ions defines a secondary cell, the electric potential of which is slightly lower than the electromotive force of the solar cell.

Upon selecting the metal ions, the solubility to the electrolyte solution 19, the balance between elution and precipitation of the metal ions when reaching saturation (equilibrium), and the capability to retain the voltage, or the like, may be considered. In the instant example of the present invention, silver ions may be used as the metal ions since silver ions satisfy all of the following qualities: a high solubility, the balance between elution and precipitation when the solution reaches a state of equilibrium, and the capability to retain the voltage.

Furthermore, the metal ions should not hinder the migration of other electrolyte ions in the electrolyte solution 19 in the solar cell.

In a case in which an iodine/iodine-based electrolyte solution 19 containing silver ions as the metal ions is used, silver dissociates into silver ions in the electrolyte solution 19, as expressed by the following formula (1):

$$2Ag(s) + I_3^- \longrightarrow 2Ag^+ + 3I^- \quad (1)$$

On the working electrode side, the reaction expressed by the following formula (2) occurs:

$$Ag^+ + e^- \rightleftharpoons Ag(s) \quad (2)$$

At the same time, the reaction expressed by the following formula (3) proceeds on the counter electrode side:

$$3I^- \rightleftharpoons I_3^- + 2e^- \quad (3)$$

When light is incident on this solar cell, the reactions expressed by the formulae (2) and (3) proceed to the right side by the generated electromotive force. As a result, the silver ions are reduced, and the solar cell is charged. When no light is incident on the solar cell, the reactions expressed by the formulae (2) and (3) proceed to the left. As result, the silver ions are oxidized, and the solar cell discharges.

As mentioned previously, the charge voltage of the above-described secondary cell is slightly lower than the generation voltage of the solar cell in this example. Thus, the solar cell is charged when sufficient light is incident on the solar cell and the charge voltage of the above-described secondary cell that is higher than the generation voltage is generated. In contrast, when the amount of light incident on the solar cell decreases and the generation voltage drops, the secondary cell discharges.

As a result, even when the amount of the light incident on the solar cell fluctuates, it is possible to contain the fluctuation of the output from the solar cell within a certain range. Accordingly, for example, when a stabilized power supply circuit is provided, supply of the electrical power to the stabilized power supply circuit is stabilized and the power supplied to apparatuses is stabilized.

In the case in which an iodine/iodine-based electrolyte solution 19 is employed, the electrolyte solution 19 has a brown color of triiodide ions. Since triiodide ions are reduced to iodide ions when light is incident, the electrolyte solution 19 turns to a colorless solution of iodide ions. When silver is added to the iodine/iodine electrolyte solution 19, silver and triiodide ions react to convert to silver ions and iodide ions as described above formulae (1) to (3), the electrolyte solution is maintained as a colorless solution. The cell, therefore, may be tinted according to requirement.

Furthermore, in order to enhance the performance of the solar cell, an electrolyte solution bath containing the electrolyte solution 19 and the metal ions may be provided outside of the solar cell. By increasing the volume of the electrolyte solution and the amount of the metal ions, the charge capacity of the secondary cell can be enhanced and the open-circuit voltage can be obtained for a longer period of time when light is blocked or the amount of the light is small.

Figure 2:
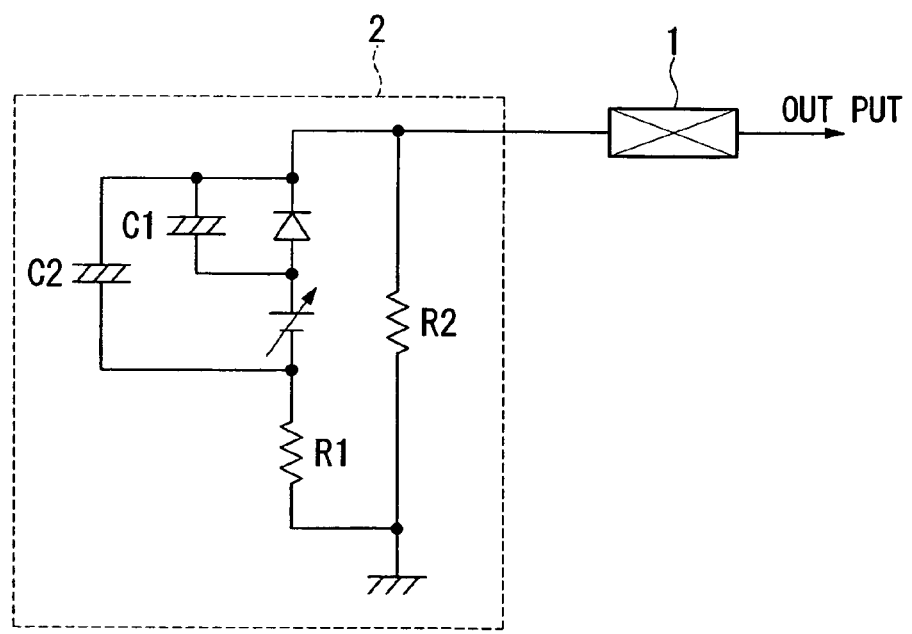
FIG. 2 is a circuit diagram illustrating a electricity circuit of the solar cell of the present invention.

FIG. 2 is a diagram illustrating an electric circuit of the above-described solar cell which is equipped with the ability to also function as a secondary cell, and the portion surrounded by the dotted line except for the secondary cells C1 and C2 is an equivalent circuit of the solar cell 2. In this equivalent circuit, R1 is the internal resistance and R2 is the dielectric resistance. The part of the generated current flows in the dielectric resistance R2, which will be wasted as the leak current. The output from the solar cell is sent to the stabilized power supply circuit 1 as mentioned above.

Furthermore, the secondary cells C1 and C2 are secondary cells functioning in this solar cell. The secondary cells C1 and C2 are charged by the generation voltage of the solar cell and discharge when the generation voltage of the solar cell drops.

Figure 3:
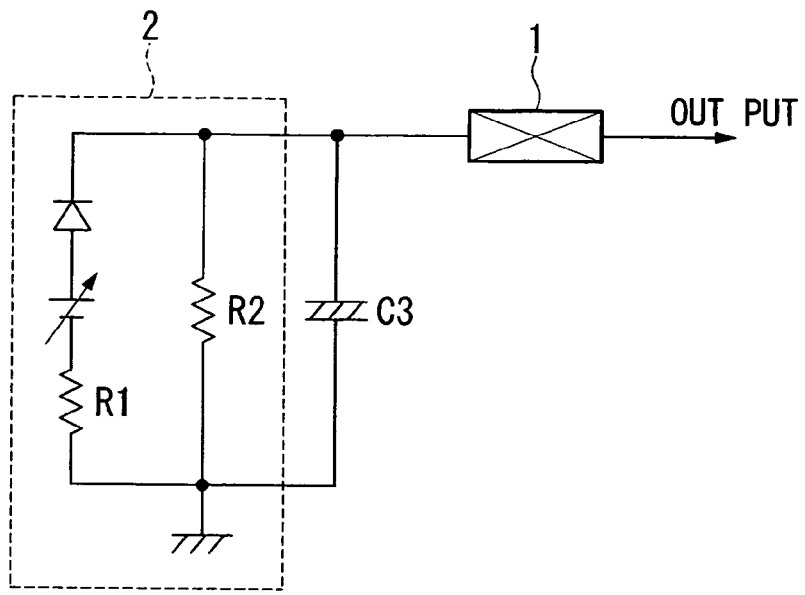
FIG. 3 is a circuit diagram illustrating an electricity circuit of a conventional solar cell.

The electricity circuit shown in FIG. 3 is an electricity circuit of a solar cell in which a secondary cell or capacitor C3 is provided outside of the conventional solar cell 2. In this system, when the amount of incident light drops and the generation voltage from the solar cell is low, the open-circuit voltage further decreases under the influence of the dielectric resistance R2 and the secondary cell or capacitor C3 is barely charged.

In contrast, in the solar cell of the present invention shown in FIG. 2, the secondary cells C1 and C2 formed in the solar cell are charged without being influenced by the dielectric resistance R2. Thus, it is possible to charge the secondary cells C1 and C2 even when the generation voltage of the solar cell is low. Thus, the generation efficiency of the solar cell as a whole is enhanced.

In such a solar cell, when a sufficient light is incident on the solar cell, the secondary cell formed therein is charged. When the open-circuit voltage decreases due to a temporary decrease in incident light, the secondary cell formed in the solar cell discharges, and the fluctuation of the output is reduced. Thus, the solar cell works stably since the incidence of the stop of the stabilized power supply circuit is reduced.

An external secondary cell or capacitor may be provided to the solar cell. Since this solar cell includes an internal secondary cell internally, a small external secondary cell having a small capacity may be sufficient; thus it can be provided at a low cost. When the amount of incident light is low and the open-circuit voltage from the intrinsic solar cell is low, this external secondary cell or capacitor can be used to charge the internal secondary cell. Thus, efficiency of the utility of sunlight is further enhanced.

Furthermore, the electrolyte solution of the present invention is not limited to a liquid electrolyte solution, and may be a solid electrolyte solution, such as a gel electrolyte solution. In addition, ion dissociative liquids, such as triethanolamine, may be used.

Furthermore, for the semiconductor layer of the present invention, materials exhibiting opto-electric conversion characteristics, such as an organic porous film, an inorganic porous film, or the like, may be used, in addition to a porous film of metal oxide.

The photovoltaic power generation apparatus of the present invention includes one or more panels, and each of the panels has multiple solar cells mentioned above. When two or more panels are used, these solar cell panels may be connected in parallel or in series.

In a photovoltaic power generation apparatus in which the multiple solar cell panels are connected in series, even when the sunlight is blocked by obstacles, such as clouds, and when the amount of light incident on some of the panels or the amount of light incident on a portion of the panels temporarily drops, the voltage which has been charged in the solar cell is discharged. Thus, the output from the panel or panels will not decrease and the output power from the entire system does not significantly decrease. In this manner, it is possible to maintain the fluctuation of the output from the solar cell within a certain range even when the amount of incident light fluctuates. Thus, efficiency of the utility of sunlight of the photovoltaic power generation apparatus is enhanced. Furthermore, since the solar cell of the present invention is equipped with the ability to also function as a secondary cell, when an external secondary cell or capacitor is provided, a small external secondary cell having a small capacity may be sufficient; thus it can be provided at a low cost.

Figure 5:
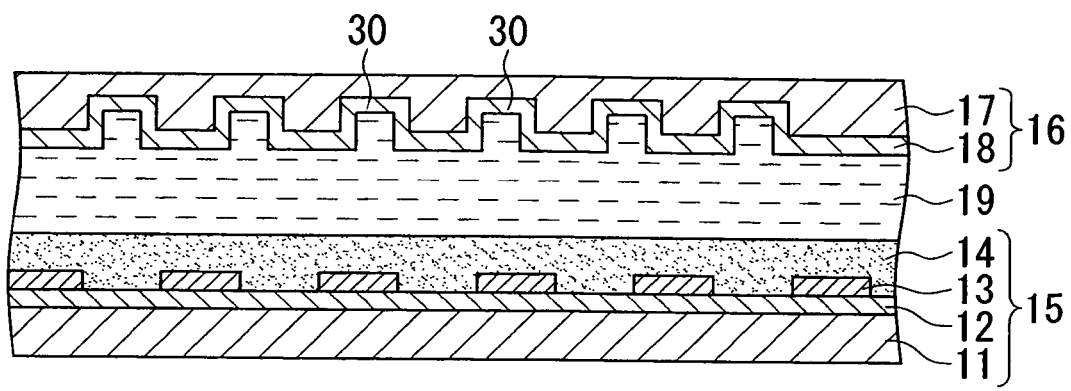
FIG. 5 is a schematic cross-sectional view of a solar cell according to a second embodiment of the present invention.
Figure 6:
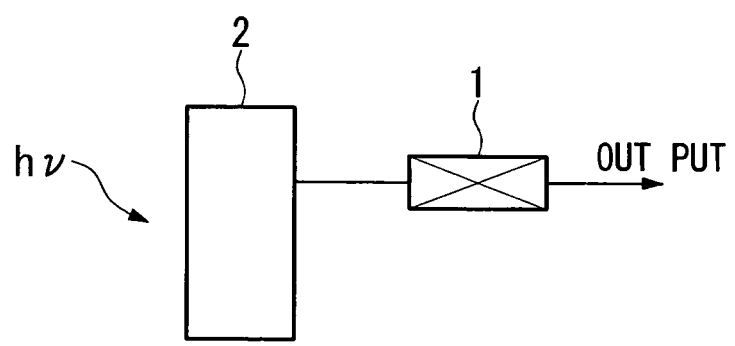
FIG. 6 is a schematic diagram illustrating an example of a conventional solar cell.

Furthermore, as a second embodiment of the present invention, recesses 30 may be provided to the counter electrode 16 of the solar cell in a longitudinal direction in the counter electrode 16 of the solar cell in order to facilitate the flow of the electrolyte solution 19, as shown in FIG. 5.

EXAMPLES

The following provides a description of specific examples. However, although the invention will be explained below in more detail by reference to the following Examples, the invention should not be construed as being limited to the following Examples only. It is to be expressly understood, that the Examples are for purpose of illustration only and are not intended as a definition of the limits of the invention.

Preparation of Solutions (Iodine-based Electrolyte Solution)

An electrolyte solution was obtained by dissolving 0.1 M of lithium iodide, 0.3 M of dimethylpropylimidazolium iodide, and 0.05 M of iodide were dissolved in acetonitrile, with respect to the entire electrolyte solution. (In other words, 1.34% by weight of lithium iodide, 8.0% by weight of dimethylpropylimidazolium iodide, and 1.26% by weight of iodine were dissolved into 89.4% by weight of acetonitrile.)

(Dye Solution)

A dye solution was obtained by dissolving 0.3 M of ruthenium pyridine complex into a mixture of 50% by weight of acetonitrile and 50% by weight of tert-butanol.

(Fabrication of Cell)

Example 1

A transparent electrically conductive film made of FTO was formed on a transparent glass substrate with a size of ten centimeters square, and mesh-like current collecting wirings having 90% of an open area ratio were formed on the transparent electrically conductive film using a sintered-type silver paste. After a porous semiconductor film made of titanium oxide was formed as a protective layer of the wirings on the current collecting wirings, titania nanoparticle paste was coated on the porous semiconductor film and sintered. Then, the porous semiconductor film was dipped into a dye solution to sensitize the porous semiconductor film with the dye, and the porous semiconductor film was dried at room temperature to form a dye sensitized porous semiconductor film. The dye sensitized porous semiconductor film was used as a working electrode.

In addition, a counter electrode was made by forming a staked body having a conductive film which is formed by sputtering platinum on a glass plate.

The working electrode and the counter electrode were staked together, and they were adhered by hot melt resin or the like, or they were bonded by compression. Between the electrodes, an iodine-based electrolyte solution was filled and sealed to obtain a cell.

The iodine-based electrolyte solution filled into the cell was changed from brown to colorless in about an hour because $I_3^-$ ions were converted to $I^-$ ions, which confirmed that silver was dissolved from the current collecting wirings made of silver into the iodine-based electrolyte solution as silver ions.

Example 2

A cell was fabricated in a manner similar to that of Example 1, except that an iodine-based electrolyte was prepared by dissolving silver powders until they were saturated, and the current collecting wirings were not formed on the transparent electrically conductive film.

Example 3

A cell was fabricated in a manner similar to that of Example 1, except that an iodine-based electrolyte was prepared by dissolving nickel powders until they were saturated, and the current collecting wirings were not formed on the transparent electrically conductive film.

Comparative Example

A cell was fabricated in a manner similar to that of Example 1, except that the current collecting wirings were not formed on the transparent electrically conductive film.

Evaluation Method

Light having an intensity of 1000 W/m$^2$ was irradiated to the cells to evaluate the photoelectric properties of the cells using a solar simulator. The results are listed in Table 1.

TABLE 1

|  | Open-circuit Voltage (mV) | Short-circuit Current (mA) |
|---|---|---|
| Example 1 | 650 | 650 |
| Example 2 | 640 | 660 |
| Example 3 | 650 | 650 |
| Comparative Example | 660 | 660 |

As shown in Table 1, the cells of Examples 1 and 2 exhibited an excellent open-circuit voltage performance, which were comparable to the cell of the Comparative Example, which did not contain silver in the electrolyte solution. This confirms that the opto-electric conversion efficiency of a cell will not deteriorate if a large amount of silver is contained in the electrolyte solution.

Next, after light having an intensity of 1000 W/m$^2$ was irradiated to the cells of Example 1 and Comparative Example for three seconds, the light was blocked to evaluate the change in open-circuit voltage using a solar simulator. The results are shown in FIG. 4.

Figure 4:
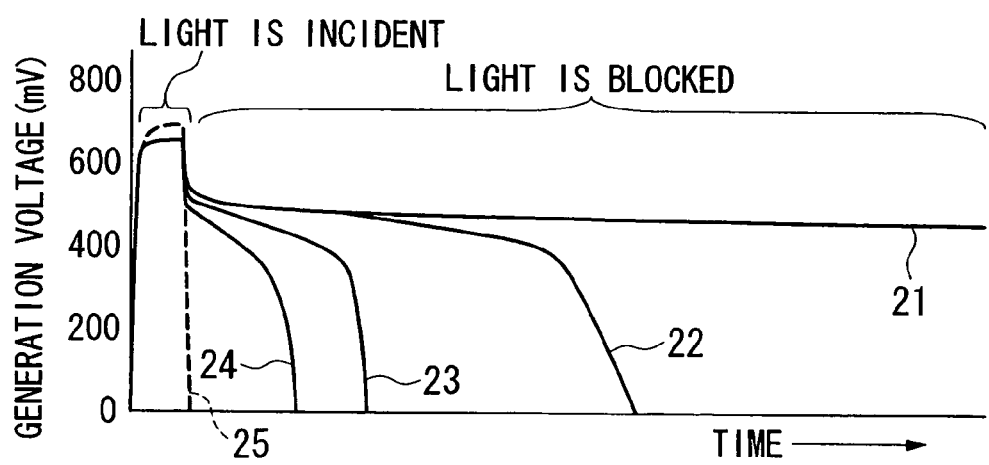
FIG. 4 is a graph illustrating the relationship between change in the open-circuit voltage and the current of the solar cell of the present invention over time.

In FIG. 4, Curve 21 represents the change in the cell voltage of the cell in Example 1 with no-load (open) across the output terminals, and Curves 22 to 24 represent the change in the cell voltage when the current flowing across the terminals was increased when the resistances r2 to r4 across the output terminals of the cell in Example 1 were set to r2>r3>r4, and r2 was 100Ω, r3 was 10Ω, r4 was 1Ω. Curve 25 represents the change in the cell voltage of Comparative Example.

Open-circuit voltages (generation voltage) were almost the same for all of the cells as shown by Curves 21 to 25. It was confirmed that the open-circuit voltage dropped sharply by more than 50 to 100 mV when the light was blocked in Curves 21 to 24. After that, an open electrical power of about 500 mV was maintained in Curve 21 in which no current flowed whereas current decreased with in an increase in the current in Curves 22 to 24. As for Curve 25, the open-circuit voltage dropped sharply, and the open-circuit voltage was not maintained after light was blocked.

Furthermore, the open-circuit voltage of the cell of Example 1 was evaluated in the similar manner by irradiating a light having an intensity of 100 W/m$^2$ using a solar simulator, and almost the same results were obtained, although the result is not shown in FIG. 4.

It is evident from the above-described results that the solar cell of the present invention is equipped with a capability of being able to function as a secondary cell. The open-circuit voltage solar cell when used as a secondary cell is about 500 mV, which is a photoelectric property comparable to that of when light is incident. Furthermore, it was confirmed that the solar cell can be charged with a low amount of incident light, and that an electrical power of about 500 mV can be obtained, irrespective of the intensity of light.

INDUSTRIAL APPLICABILITY

Since the solar cell of the present invention is equipped with a capability of being able to function as a secondary cell, the internal second cell discharges and the fluctuation of the output is reduced even when the amount of light incident on the solar cell is temporarily decreased and the output from the intrinsic solar cell drops; thus the output is stabilized. When the amount of incident light is low and the open-circuit voltage from the intrinsic solar cell is low, the secondary cell can be used to charge the internal secondary cell. Thus, efficiency of the utility of sunlight is enhanced compared to a conventional solar cell which is equipped with an external secondary cell or capacitor.

Furthermore, since the photovoltaic power generation apparatus of the present invention includes the solar cell described above, the stability of output and efficiency of the utility of sunlight is enhanced. Thus, it is possible to simplify accompanying electricity circuit or the like, and to provide the apparatus at a lower cost.

Although the above exemplary embodiments of the present invention have been described, it will be understood by those skilled in the art that the present invention should not be limited to the described exemplary embodiments, but that various changes and modifications can be made within the spirit and scope of the present invention.

What is claimed is:

1. A solar cell comprising:
   a transparent electrically conductive film;
   a current collecting wiring made of a metal film that is provided on the transparent electrically conductive film, wherein the metal film is made of silver;
   a semiconductor provided directly on the current collecting wiring;
   a conductive film provided on the semiconductor, the conductive film being made of platinum, ITO or FTO;
   an electrolyte solution filled in the space between the semiconductor and the conductive film, wherein:
   electrolyte solution contains an iodine-based electrolyte and metal ions;
   a main component of the metal ions is silver ions, and
   an oxidation-reduction reaction of the silver ions defines a secondary cell, the electrical potential of which is slightly lower than an electromotive force of the solar cell.

2. A photovoltaic power generation apparatus comprising a solar cell according to claim 1.

3. The solar cell according to claim 1, further comprising a dye provided on the semiconductor wherein the dye has an absorption band in the visible light range or near infrared range.

4. The solar cell according to claim 3, wherein the dye is selected from the group consisting of azo dyes, methane dye, fullerene derivatives, quinines, cumarin, eosine, rhoadamine, merocyanine, porphyrin, phthalocyanine, ruthenium complex dyes, and dyes derived from plants.

5. The solar cell according to claim 1, wherein the electrolyte solution is a nonaqueous electrolyte solution prepared by dissolving an electrolyte into a nonaqueous solvent or a fused salt obtained by fusing an electrolyte.

6. The solar cell according to claim 5, wherein the nonaqueous electrolyte solution contains electrolytes of lithium ions, cobalt ions, tetraalkyl ions or imidazolium ions.

7. The solar cell according to claim 5, wherein the non-aqueous solvent has a relative dielectric constant greater than 20.

8. The solar cell according to claim 5, wherein the electrolyte solution contains a redox couple.

9. The solar cell according to claim 5, wherein an electrolyte solution bath containing the electrolyte solution and the metal ions are provided outside of the solar cell.

10. The photovoltaic power generation apparatus comprising the solar cell according to claim 2, further comprising a secondary cell or a capacitor external to the solar cell.

11. The solar cell according to claim 1, wherein the conductive film contains recesses in a longitudinal direction.

* * * * *

UNITED STATES PATENT AND TRADEMARK OFFICE
CERTIFICATE OF CORRECTION

PATENT NO. : 7,825,330 B2  
APPLICATION NO. : 11/022672  
DATED : November 2, 2010  
INVENTOR(S) : Kenichi Okada, Hiroshi Matsui and Nobuo Tanabe Page 1 of 1

It is certified that error appears in the above-identified patent and that said Letters Patent is hereby corrected as shown below:

On the Title Pg should read,

Item (22) PCT filing date: Jul. 8, 2003 (2003/07/08)

Item (86) PCT No.: PCT/JP2003/08653

Item (87) PCT Publication Date: Jan. 15, 2004 (2004/01/15)

PCT Publication No. WO2004/006381

Item (30) Foreign Application Priority Data: Jul. 9, 2002 (2002/07/09)

2002-199958 (JP)

Signed and Sealed this  
Twenty-ninth Day of March, 2011

David J. Kappos  
*Director of the United States Patent and Trademark Office*